(12) United States Patent
Mrowzinski (10) Patent No.: US 9,897,256 B2
(45) Date of Patent: Feb. 20, 2018

(54) COMPRESSED GAS DELIVERY METHOD

(71) Applicant: CNG Services, LLC, Dublin, OH (US)

(72) Inventor: David Joseph Mrowzinski, Delaware, OH (US)

(73) Assignee: CNG Services, LLC, Dublin, OH (US)

( * ) Notice: Subject to any disclaimer, the term of this patent is extended or adjusted under 35 U.S.C. 154(b) by 0 days.

(21) Appl. No.: 15/705,874

(22) Filed: Sep. 15, 2017

(65) Prior Publication Data

US 2018/0003343 A1    Jan. 4, 2018

Related U.S. Application Data

(63) Continuation of application No. 14/862,598, filed on Sep. 23, 2015, now Pat. No. 9,772,068.

(Continued)

(51) Int. Cl.
*F17C 5/06* (2006.01)
*F17C 5/00* (2006.01)

(52) U.S. Cl.
CPC ............... *F17C 5/06* (2013.01); *F17C 5/007* (2013.01); *F17C 2205/0142* (2013.01); *F17C 2205/0326* (2013.01); *F17C 2205/0335* (2013.01); *F17C 2205/0338* (2013.01); *F17C 2205/0341* (2013.01); *F17C 2221/012* (2013.01); *F17C 2221/033* (2013.01); *F17C 2223/0123* (2013.01); *F17C 2223/033* (2013.01);

(Continued)

(58) Field of Classification Search
CPC .... F17C 5/06; F17C 5/007; F17C 2205/0326; F17C 2221/012; F17C 2223/0123
USPC ...................................................... 141/3, 20
See application file for complete search history.

(56) References Cited

U.S. PATENT DOCUMENTS 5,370,159 A    12/1994  Price
5,406,988 A     4/1995  Hopkins
(Continued)

FOREIGN PATENT DOCUMENTS

| JP | 2009036213 A | 2/2009 |
| WO | 2009013415 A1 | 1/2009 |
| WO | 2014084243 A1 | 6/2014 |

OTHER PUBLICATIONS

International Searching Authority, Search Report and Written Opinion issued in International Application No. PCT/US2015/057542 dated Feb. 8, 2016, 16 pages.

*Primary Examiner* — Timothy L Maust
(74) *Attorney, Agent, or Firm* — Wood Herron & Evans LLP (57) ABSTRACT

A method of continuously conveying compressed gas to a plurality of vehicles, where the plurality of vehicles includes at least a first vehicle having a higher tank pressure and a second vehicle having a lower tank pressure that are simultaneously seeking compressed gas from the same delivery conduit. The method includes compressing gas using at least one compressor, conveying the compressed gas from the at least one compressor to a backpressure apparatus, conveying a non-bypass fill portion through the backpressure apparatus, diverting a bypass fill portion through a bypass conduit to at least one distributor, conveying the bypass fill portion through the at least one distributor to at least one of the one or more delivery conduits and subsequently to at least the first vehicle, and conveying the non-bypass fill portion through at least one of the one or more the delivery conduits to at least the second vehicle.

18 Claims, 6 Drawing Sheets

Related U.S. Application Data (60) Provisional application No. 62/069,610, filed on Oct. 28, 2014.

(52) U.S. Cl.
CPC ............ *F17C 2223/036* (2013.01); *F17C 2225/0123* (2013.01); *F17C 2225/036* (2013.01); *F17C 2227/0157* (2013.01); *F17C 2227/0185* (2013.01); *F17C 2227/043* (2013.01); *F17C 2250/032* (2013.01); *F17C 2260/046* (2013.01); *F17C 2265/012* (2013.01); *F17C 2265/065* (2013.01); *F17C 2270/0139* (2013.01); *Y02E 60/321* (2013.01)

(56) References Cited

U.S. PATENT DOCUMENTS

| | | |
|---|---|---|
| 5,409,046 A | 4/1995 | Swenson et al. |
| 5,479,966 A | 1/1996 | Tison et al. |
| 5,676,180 A | 10/1997 | Teel |
| 6,360,793 B1 | 3/2002 | Sugano et al. |
| 6,722,399 B1 | 4/2004 | Cano |
| 7,069,730 B2 | 7/2006 | Emmer et al. |
| 7,128,103 B2 | 10/2006 | Mitlitsky et al. |
| 9,377,164 B2 | 6/2016 | Utal et al. |
| 9,435,488 B2 | 9/2016 | Nagura et al. |
| 9,772,068 B2 * | 9/2017 | Mrowzinski .............. F17C 5/06 |
| 2013/0068345 A1 | 3/2013 | Ding et al. |
| 2013/0248000 A1 | 9/2013 | Killeen et al. |
| 2015/0083273 A1 | 3/2015 | Thiessen |
| 2016/0146400 A1 | 5/2016 | Allidieres |

\* cited by examiner

COMPRESSED GAS DELIVERY METHOD

CROSS-REFERENCE TO RELATED APPLICATIONS

This application is a Continuation of co-pending U.S. patent application Ser. No. 14/862,598, filed Sep. 23, 2015, which claims the filing benefit of U.S. Provisional Application Ser. No. 62/069,610, filed Oct. 28, 2014, the disclosures of which are hereby incorporated by reference in their entireties.

FIELD OF THE INVENTION

The present invention relates generally to compressed gas distribution and, more particularly, to compressed gas distribution for continuously refueling multiple vehicle tanks.

BACKGROUND OF THE INVENTION

Typical compressed gas systems for filling one or more vehicles are fast-fill, time-fill, or combination-fill. A fast-fill compressed gas system dispenses compressed gas at a rate similar to what a user would experience using a conventional gasoline or diesel system. To achieve this rate of fill, a fast-fill compressed gas system utilizes one or more storage tanks and compressors to dispense compressed gas to vehicles. A time-fill compressed gas system is designed where a longer fueling window is available, typically overnight from 4 to 12 hours. In a time-fill compressed gas system, vehicles are generally filled directly from one or more compressors, not from storage banks. A combination-fill compressed gas system combines features of both fast-fill and time-fill systems, thereby having the ability to fast-fill vehicles throughout the day and also time-fill vehicles overnight.

There are multiple types of fast-fill systems including cascade fast-fill systems and buffered fast-fill systems. Cascade fast-fill systems are commonly used in retail applications and where vehicles arrive randomly for refueling. Cascade fast-fill systems are designed to have enough storage capacity to handle peak fuel demand with one or more appropriately sized compressors to meet the fueling demand and adequately replenish the compressed gas storage over a given period. Unlike cascade fast-fill systems, buffered fast-fill systems dispense directly from the compressor into one or more vehicles and have a smaller quantity of storage. Buffered fast-fill systems are commonly utilized for captive fleets for sequential fueling of high fuel use vehicles one after another, such as taxis and transit buses. The storage is designed to allow the compressors to operate while the vehicles are being interchanged.

In the United States, the industry standard pressure rating for compressed natural gas for a user's vehicle tank is 3,600 psig at 70° F. While 3,600 psig at 70° F. is the target vehicle tank pressure, this could change significantly based on vehicle design and the region or country of operation. For example, some systems in the United States and other systems in other countries are only rated to 3,000 psig. Vehicle tanks are typically designed to be filled to 125% of their rated pressure. Thus, a 3,000 psig vehicle tank can be safely filled to approximately 3,750 psig, while a 3,600 psig vehicle tank can safely be filled to approximately 4,500 psig. Most compressed gas systems would not fill a 3,600 psig rated tank past approximately 4,100 psig, since the desired tank pressure is approximately 3,600 psig at 70° F.

A typical cascade fast-fill system has one or more compressors for compressing gas and three storage banks: a low storage bank, a middle storage bank, and a high storage bank. Outside the United States, a control system typically directs the flow of compressed gas from the low, middle, and high storage banks to one or more compressed gas dispensers, while in the United States, one or more dispensers typically direct the flow of compressed gas from the low, middle, and high storage banks to one or more vehicles located at the one or more compressed gas dispensers. A control system, commonly referred to as a "priority panel," typically operates so that the low storage bank conveys a storage fill portion of compressed gas through the control system to a vehicle tank. As used herein, the terminology "storage fill portion of compressed gas" is intended to describe that portion of the compressed gas from the one or more compressors that is either stored in one or more of the storage banks or that portion of the compressed gas stored in one or more storage banks that is dispensed through the control system to one or more vehicles. The control system or priority panel or dispenser operates so that the low storage bank terminates fill upon a predetermined characteristic, such as a minimally accepted flow rate or a substantially equalized pressure between the low storage bank and the vehicle tank. Minimally accepted flow rate could be utilized since as the storage bank pressure and the vehicle tank pressure equalize, the pressure differential between the storage bank pressure and the vehicle tank decreases, causing the flow rate to decrease. For example, the low storage bank may terminate fill at approximately 2,000 psig. However, this 2,000 psig value can significantly vary, as this pressure is highly dependent upon a number of variables including the tank pressure at fill initialization, the pressure of the gas supply, and environmental factors.

After the control system or priority panel or dispenser terminates the fill from the low storage bank, the control system or dispenser then operates to convey a storage fill portion of compressed gas from the middle storage bank, through the control system, and to the vehicle. The control system or the dispenser allows gas to flow from the middle storage bank to terminate fill upon a predetermined characteristic, such as minimally accepted flow rate or substantially equalized pressure between the middle storage bank and the vehicle tank. In this embodiment, the middle storage bank may terminate fill at approximately 3,000 psig. However, like the 2,000 psig termination of the low storage bank, this value can significantly vary, as it is dependent upon a number of variables.

After the control system or priority panel or dispenser terminates the fill from the middle storage bank, the control system or dispenser then operates to convey a storage fill portion of compressed gas from the high storage bank, through the control system, and to the vehicle. The control system or dispenser then operates the high storage bank to terminate fill upon a predetermined characteristic, such as a minimally accepted flow rate or a substantially equalized pressure between the high storage bank and the vehicle tank. In this embodiment, the high storage bank may terminate fill at approximately 3,400 psig, for example. Like the 2,000 psig termination of the low storage bank and the 3,000 psig termination of the middle storage bank, this value can significantly vary, as it is dependent upon a number of variables. Since a full tank pressure is approximately 3,600 psig at 70° F., the vehicle tank may then be directly filled. Direct fill means that a direct fill portion of the compressed gas is conveyed from at least one compressor through the control system or priority panel and directly to the vehicle being filled. The terminology "direct fill portion of compressed gas," as used herein, is intended to describe that portion of the compressed gas from the one or more compressors that is not stored in any storage bank arrangement, but rather, is dispensed directly through the control system to one or more vehicles.

A buffered fast-fill system utilizes a single storage bank. The storage bank could be a single storage tank or the storage bank could have multiple storage tanks. The control system conveys a storage fill portion of compressed gas from the storage bank to the vehicle through the control system. The control system operates the storage bank to terminate fill upon a predetermined characteristic. Since a full tank fill is approximately 3,600 psig at 70° F., the vehicle tank could then utilize direct fill.

Currently, in either a cascade fast-fill system or a buffered fast-fill system, a problem arises when multiple vehicles having differing tank pressures seek compressed gas from the same storage bank, or when multiple vehicles having differing tank pressures seek to be directly filled. For example, when two vehicles having differing tank pressures seek compressed gas from the same storage bank, a vehicle having a lower tank pressure receives a greater percentage, if not 100 percent, of the compressed gas than the vehicle having a higher tank pressure. This is because, without external influence, compressed gas flows from a region of higher pressure to a region of lower pressure. As a result, when compressed gas flows from the same storage bank to the vehicle having a lower tank pressure, the flow of compressed gas to the vehicle having a higher tank pressure can greatly decrease or even stop. Logically, the user of the vehicle having a higher tank pressure may become frustrated that, for at least a period of time, little or no compressed gas is being dispensed to the user's vehicle. This period of time can last from a few seconds to a few minutes.

Additional problems may result where little or no compressed gas is dispensed to a vehicle having a higher tank pressure. The user of a vehicle having a higher tank pressure may prematurely terminate the fill by manually turning off or disconnecting from the dispenser, or the dispenser may automatically terminate the fill where little or no compressed gas is conveyed to a vehicle having a higher tank pressure. Further, many compressed gas dispensers obtain data during the fill to create target fill pressures based on ambient temperature and the amount of gasoline gallon equivalents dispensed. By terminating the fill early, the dispenser loses these set points.

Even further, when a user attempts to top off the prior incomplete fill, the user is not usually able to obtain a complete fill. As an example, on a warm day, the dispenser dispenses compressed gas to the vehicle until the tank reaches approximately 4,000 psig. Over time, as the compressed gas cools, the pressure of the compressed gas decreases to the target pressure of 3,600 psig at 70° F. However, if the fill is terminated prematurely either by the user or by the dispenser, a complete fill is difficult for a period of time thereafter, since the dispenser assumes the compressed gas within the vehicle tank is at ambient temperature.

Therefore, there is a need for a compressed gas delivery system that eliminates or greatly decreases the period of time in which little or no compressed gas is dispensed to a vehicle having a higher tank pressure to provide a continuous fueling experience.

SUMMARY OF THE INVENTION

The present invention overcomes the foregoing and other shortcomings and drawbacks of known compressed gas delivery systems heretofore known for refueling multiple vehicle tanks, when multiple vehicles having differing tank pressures seek compressed gas from the same storage bank or when multiple vehicles having differing tank pressures seek to be directly filled. While the invention will be described in connection with certain embodiments, it will be understood that the invention is not limited to these embodiments. On the contrary, the invention includes all alternatives, modifications, and equivalents as may be included within the spirit and scope of the present invention.

In one embodiment, a compressed gas delivery system includes a control system and at least one compressor fluidly connected to the control system. The compressor is configured to provide a compressed gas to the control system. The compressed gas delivery system further includes one or more backpressure apparatuses fluidly connected between the at least one compressor and the control system that is configured to convey a direct fill portion and a storage fill portion of the compressed gas to the control system.

The compressed gas delivery system further includes a storage bank arrangement configured to receive the storage fill portion through the control system. The storage bank arrangement, in turn, is configured to convey the storage fill portion to the control system for dispensing into one or more vehicles during a dispensing operation. The compressed gas delivery system further includes at least one distributor fluidly connected to the control system downstream thereof. A bypass conduit is fluidly connected between the at least one compressor and the backpressure apparatus that is configured to convey a bypass fill portion of the compressed gas to the at least one distributor. As used herein, the terminology "bypass fill portion of compressed gas" is intended to describe that portion of the compressed gas that is neither stored in any one of the storage banks, nor dispensed directly to one or more vehicles through the priority panel or control system, but rather that portion of the compressed gas from the one or more compressors that bypasses the control system or priority panel entirely, and is dispensed directly to one or more vehicles located at the dispensers. As used herein, the terminology "non-bypass fill portion of compressed gas" is intended to describe that portion of compressed gas that is prevented from passing through the bypass conduit, but rather, that portion of the compressed that flows through the backpressure apparatus as either a direct fill portion of compressed gas or a storage fill portion of compressed gas.

The compressed gas delivery system further includes one or more delivery conduits. The at least one distributor is configured to convey at least the bypass fill portion of the compressed gas to at least one of the one or more delivery conduits.

In some embodiments, the storage bank arrangement includes a low storage bank, a middle storage bank, and a high storage bank, each being fluidly connected to the control system, while in other embodiments the storage bank arrangement includes a single storage bank.

In some embodiments, the control system is configured to convey the storage portion of the compressed gas from the high storage bank to at least one of the one or more delivery conduits.

In some embodiments, the one or more delivery conduits include a low storage bank delivery conduit, a middle storage bank delivery conduit, and at least two high storage bank delivery conduits, each being fluidly connected to the control system. Other embodiments include a high storage bank delivery conduit and a bypass conduit, each being fluidly connected to the control system. Further, other embodiments use another delivery conduit, such as the middle bank storage conduit, to distribute the bypass fill portion.

In some embodiments, the compressed gas is natural gas, while in other embodiments, the compressed gas is hydrogen.

In some embodiments, the backpressure apparatus creates a lower pressure gas region between the backpressure apparatus and the control system.

In some embodiments, the compressed gas delivery system may further include a coalescing filter fluidly connected between the backpressure apparatus and the control system.

A method of continuously conveying compressed gas to a plurality of vehicles is also provided. The plurality of vehicles includes at least a first vehicle having a higher tank pressure and a second vehicle having a lower tank pressure that are simultaneously seeking compressed gas from the same storage bank. The method includes compressing gas using at least one compressor and conveying the compressed gas from at least one compressor to a backpressure apparatus. A bypass conduit is fluidly connected between the at least one compressor and the backpressure apparatus for diverting a bypass fill portion of the compressed gas through the bypass conduit. The method further includes conveying the bypass fill portion of the compressed gas to at least one of the plurality of vehicles.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Referring now to the figures, and to FIGS. 1-5 in particular, a compressed gas delivery system 10, 100, 200, 300, 400 is shown according to various embodiments of the present invention. The exemplary compressed gas delivery system 10, 100, 200, 300, 400 is designed to continuously refuel multiple vehicle tanks, when multiple vehicles having differing tank pressures seek compressed gas from the same storage bank 16a-c (of which any of the compressors 12a-c may be directing gas to) or when multiple vehicles having differing tank pressures seek to be directly filled from one or more compressors 12a-c of the compressed gas delivery system 10, 100, 200, 300, 400.

Figure 1:
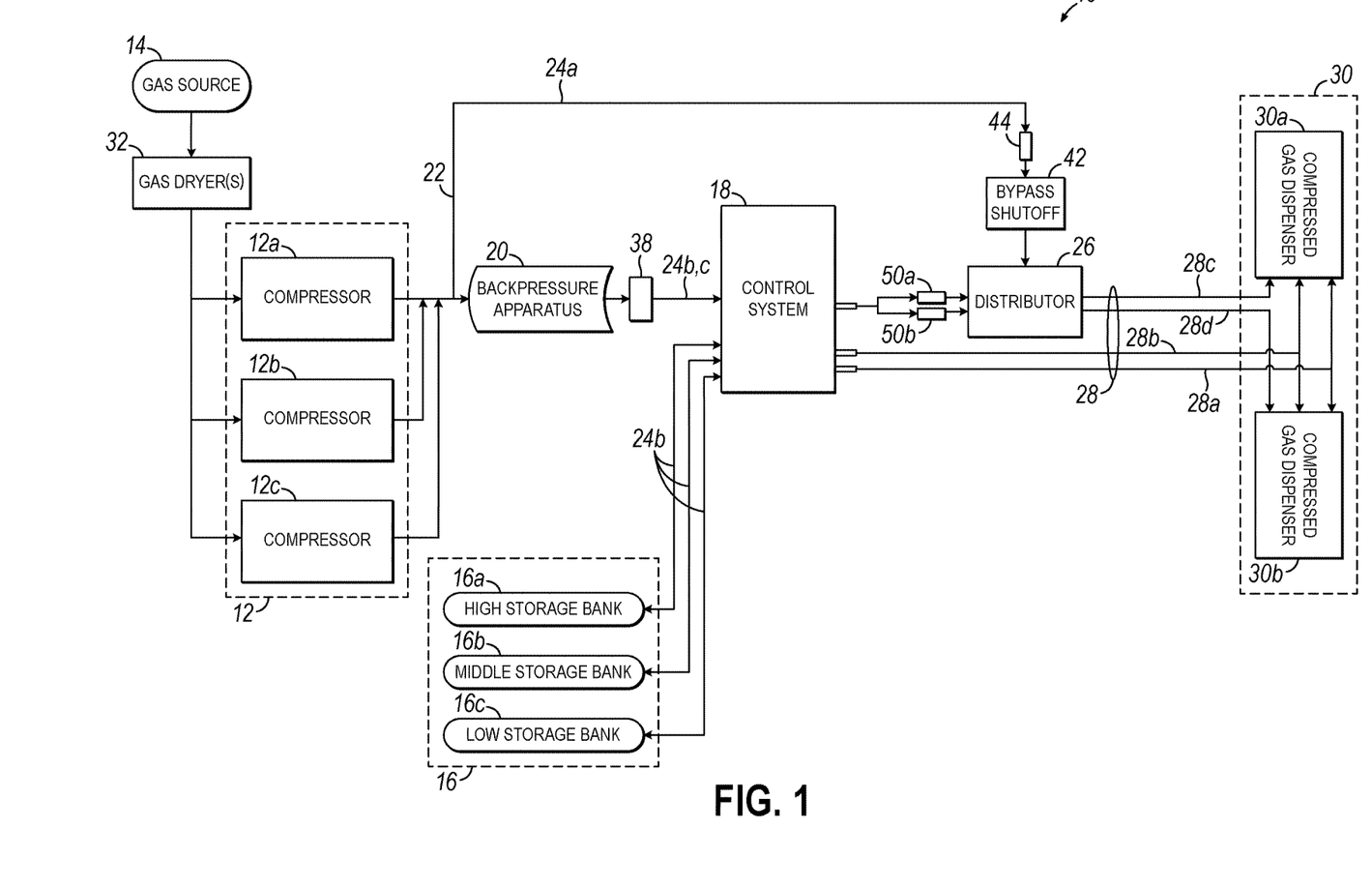
FIG. 1 is a schematic of a compressed gas delivery system according to an embodiment of the present invention.

As shown in FIG. 1, the compressed gas delivery system 10 may have a variety of components, including one or more compressors 12, such as compressors 12a-c, for compressing gas received from a gas source 14, a storage bank arrangement 16 comprising one or more storage banks 16a-c for storing the compressed gas, a control system 18 for directing the flow of compressed gas, a backpressure apparatus 20 for creating a backpressure of compressed gas between the backpressure apparatus 20 and the compressors 12a-c, a bypass conduit 22 for bypassing a bypass fill portion 24a of compressed gas, a distributor 26 for receiving the bypass fill portion 24a of compressed gas, and a plurality of delivery conduits 28 for conveying the compressed gas to a plurality of compressed gas dispensers 30, for dispensing the compressed gas into one or more vehicles (not shown) located at the compressed gas dispensers 30. As described above, and as will be described in more detail below, the terminology "bypass fill portion of compressed gas" is intended to describe that portion of the compressed gas from the compressors 12a-c that is neither stored in any one of the storage banks 16a-c, nor dispensed directly to one or more vehicles through the control system 18 or priority panel, but rather that portion of the compressed gas from the compressors 12a-c that bypasses the control system 18 or priority panel entirely, and is dispensed directly to one or more vehicles located at the compressed gas dispensers 30.

The gas source 14 provides gas to the compressed gas delivery system 10, 100, 200, 300, 400 potentially at a variety of different pressures. The compressed gas delivery system 10, 100, 200, 300, 400 is suitable for dispensing a variety of gases. The gas to be compressed could be natural gas, hydrogen, a gaseous vehicle fuel, or any other suitable gas. Considering a natural gas supply in particular, natural gas is typically supplied at a low pressure (less than 0.5 pounds per square inch gauge (psig)), a medium pressure (5-60 psig), or a high pressure (greater than 100 psig). One or more gas dryers 32 may be provided to remove moisture from the gas prior to compression. The gas should be sufficiently dried to remove moisture prior to being compressed by the compressors 12a-c. Alternatively, the gas could be sufficiently dried prior to being supplied to the compressed gas delivery system 10, 100, 200, 300, 400. This eliminates the need to include the gas dryers 32.

At least one compressor 12 is provided in the compressed gas delivery system 10, 100, 200, 300, 400 to compress the gas supplied by the gas source 14 to a desired pressure. FIGS. 1-5 show three compressors 12a-c operating in parallel. However, any suitable number of compressors 12 may be utilized. Storage capacity, number of compressors, and compressor size are preferably balanced to ensure that compressed gas is available during the necessary time frames and to minimize the number of times the compressors 12a-c are turned on and off. The horsepower rating and the gas inlet pressure of compressors 12a-c determine the gas's flow rate, measured in standard cubic feet per minute (scfm) or gasoline gallon equivalent per hour (gge/hr). Multiple compressors 12a-c increase the compression flow rate and create system redundancy. Typically, compressors 12a-c compress the supplied gas to approximately 4,200 psig to fill a vehicle having a desired tank pressure of approximately 3,600 psig at 70° F.

Figure 2:
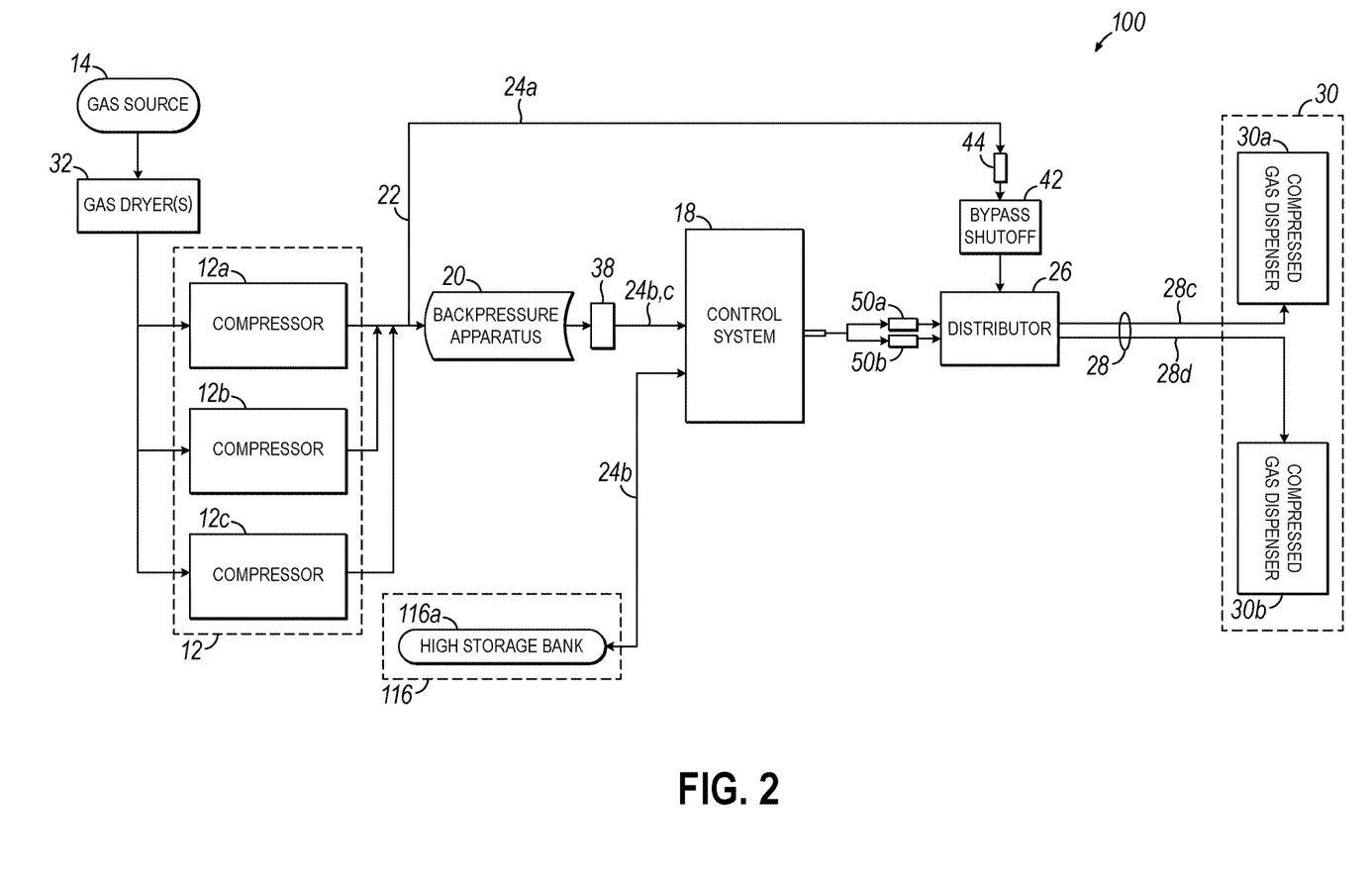
FIG. 2 is a schematic of a compressed gas delivery system according to another embodiment of the present invention.
Figure 3:
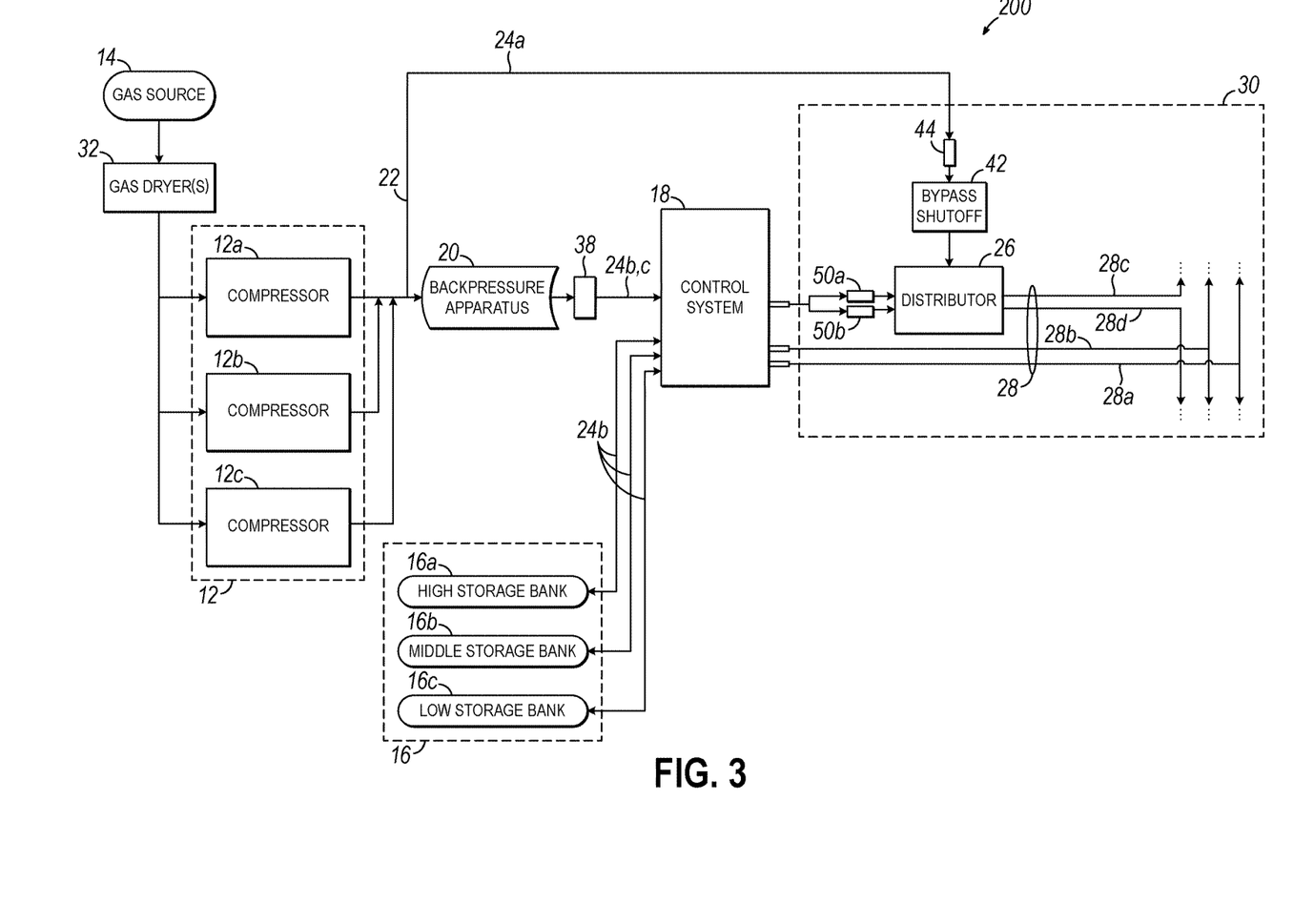
FIG. 3 is a schematic of a compressed gas delivery system according to yet another embodiment of the present invention.
Figure 4:
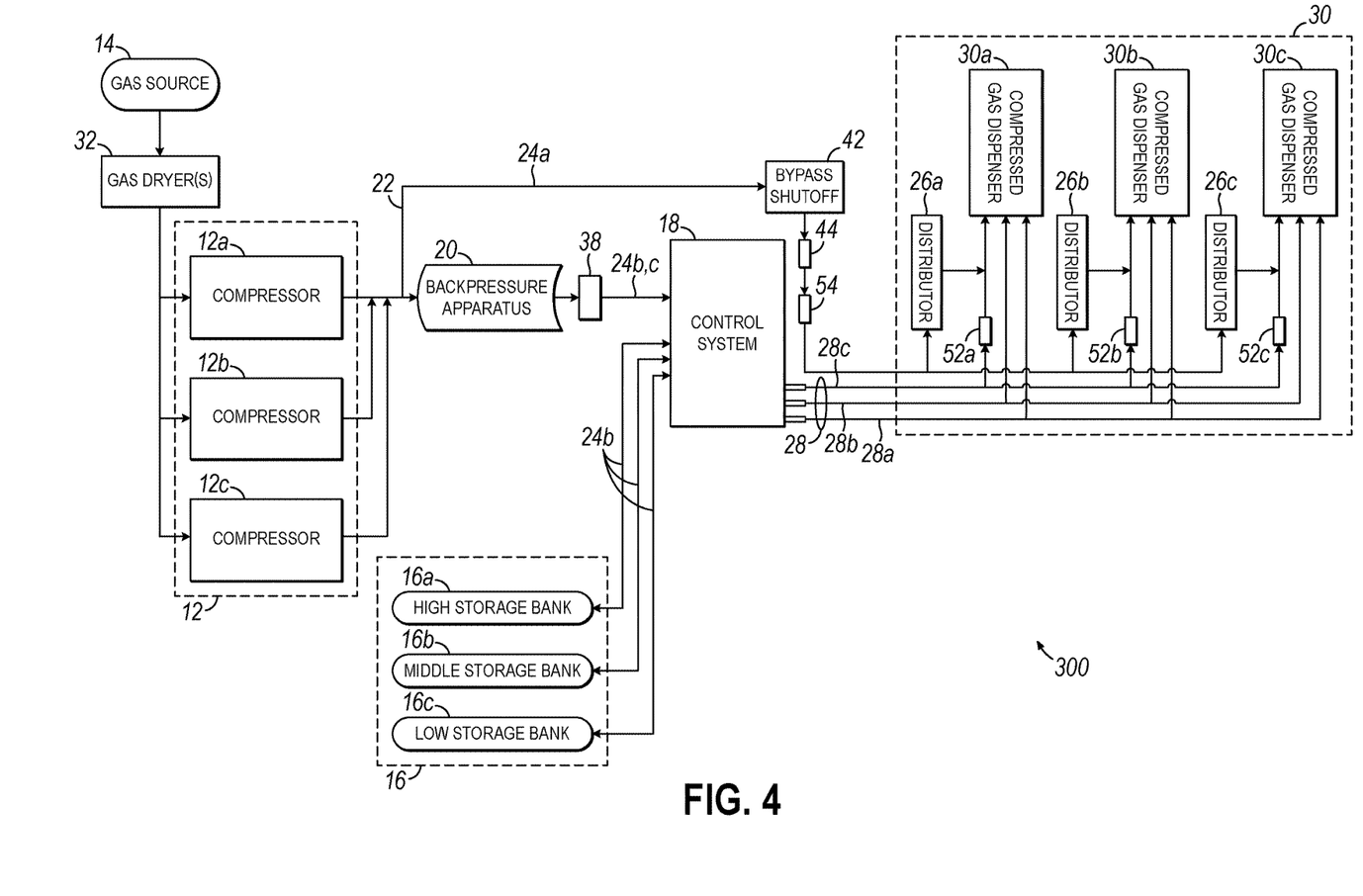
FIG. 4 is a schematic of a compressed gas delivery system according to still yet another embodiment of the present invention.
Figure 5:
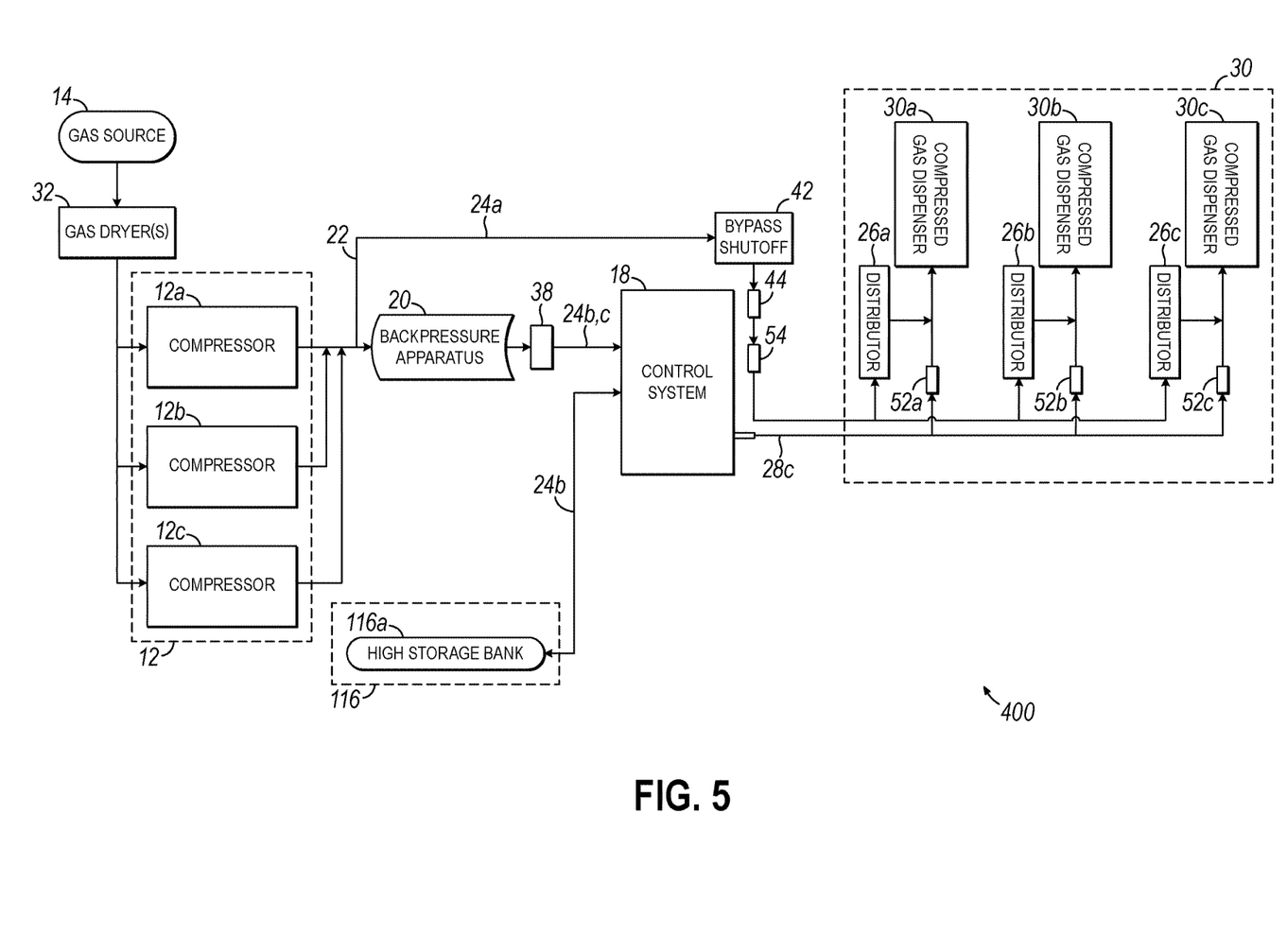
FIG. 5 is a schematic of a compressed gas delivery system according to still yet another embodiment of the present invention.

In the embodiment of the compressed gas delivery system 10, 200, 300 shown in FIGS. 1, 3, and 4 respectively, the storage bank arrangement 16 stores a storage fill portion 24b of the compressed gas. As shown, the storage bank arrangement 16 has multiple storage banks 16a-c. The compressed gas delivery system 10, 200, 300 as shown in FIGS. 1, 3, and 4, is designed as a cascade fast-fill system according to one embodiment. Alternatively, the compressed gas delivery system 100, 400 shown in FIGS. 2 and 5 is designed as a buffered fast-fill system according to another embodiment. In this embodiment, as shown in FIGS. 2 and 5, the storage bank arrangement 116 has a single storage bank 116a. Typically, each of the storage banks 16a-c, 116a is filled to approximately 4,200 psig. However, the pressure of storage banks 16a-c, 116a is not limited to approximately 4,200 psig. One of ordinary skill in the art will appreciate that a range of suitable pressures for the compressed gas delivery system 10, 100, 200, 300, 400 is possible for each of the storage banks 16a-c, 116a.

The compressed gas delivery system 10, 200, 300 shown in FIGS. 1, 3, and 4 utilizes a cascade fast-fill system having the storage bank arrangement 16 comprising the three storage banks 16a, 16b, 16c; i.e., a high storage bank 16a, a middle storage bank 16b, and a low storage bank 16c. However, there is no requirement that the storage bank arrangement 16 have three storage banks 16a-c for a cascade fast-fill system. It may be preferable, instead, that the storage bank arrangement 16 have more or less storage banks depending on the storage and dispensing requirements of the compressed gas delivery system 10, 200, 300. Further, each storage bank 16a-c, 116a may have one or more storage tanks (not shown), depending on the required capability of the compressed gas delivery system 10, 100, 200, 300, 400 for dispensing operations.

In the cascade fast-fill system shown in FIGS. 1, 3, and 4, control system 18 controls the sequential opening and closing of the multiple storage banks, commonly referred to as the "low storage bank 16c," "middle storage bank 16b," and "high storage bank 16a," respectively, to obtain the preferred filled vehicle tank pressure. The control system 18 uses actuated valves that control the flow of gas into a vehicle or into the storage bank arrangement 16, with each storage bank 16a-c comprising at least one storage tank. These actuated valves are typically electronically controlled or gas actuated, but a person of ordinary skill in the art will appreciate that other valves could be utilized.

In one embodiment, the control system 18 comprises a "priority panel" as will be understood by those of ordinary skill in the art. Suitable control systems 18 or priority panels for use in the present invention are commercially available from J-W Energy (Addison, Tex.) and ANGI Energy Systems (Janesville, Wis.), for example.

Depending on at least the pressure of the gas supplied by the gas source 14, the vehicle's tank pressure at fill initialization, and the user's desired fill pressure, the vehicle tank may not need to utilize all of the storage banks 16a-c or the direct fill. Also, the flow rate for the storage fill portion 24b is typically greater than the flow rate for a direct fill portion 24c. The flow rate for the direct fill portion 24c is limited at least by size of the compressors 12a-c and the flow rate and size of the conduits in the compressed gas delivery system 10, 100, 200, 300, 400. The flow rate for the storage fill portion 24b is limited at least by the size of the conduits in the compressed gas delivery system 10, 100, 200, 300, 400.

Referring now to FIGS. 1-5, and according to one aspect of the present invention, a backpressure apparatus 20 is fluidly connected between the compressors 12a-c and the control system 18 to create a region of higher gas pressure between the compressors 12a-c and the backpressure apparatus 20, and a region of lower gas pressure between the backpressure apparatus 20 and the control system 18. In one embodiment, the region of higher gas pressure is approximately 4,000 psig and the region of lower gas pressure is approximately 2,000 psig. While not shown, there may be more than one backpressure apparatus 20 fluidly connected between the compressors 12a-c and the control system 18.

A suitable backpressure apparatus 20 for use in the present invention is a backpressure regulator, such as a TesCom 54-2300 Series Back Pressure Regulator, commercially available from TesCom (Austin, Tex.) or a Swagelok BSHN6-02-11-WK02-11-WK back pressure regulator, commercially available from Swagelok (Solon, Ohio). The backpressure apparatus 20 could also be a reducing adaptor, a mechanical valve, a positional valve, or any other suitable device that creates the desired higher and lower gas pressure regions between the compressors 12a-c and the control system 18. The backpressure apparatus 20 may be installed either inside or outside the control system 18 or priority panel.

The creation of both the region of higher gas pressure and the region of lower gas pressure is beneficial. First, as will be described in greater detail below, the region of higher gas pressure can be used to divert the bypass fill portion 24a of compressed gas to a distributor 26 located fluidly downstream of the control system 18, so that the bypass fill portion 24a itself does not enter the control system 18. Secondly, the region of lower gas pressure aids in the separation of unwanted heavy hydrocarbons that can exist in the compressed gas. Using the Joule-Thomson effect, unwanted heavy hydrocarbons may be removed from the compressed gas supplied to the control system 18. In one embodiment, an optional filter 38 can be fluidly connected between the backpressure apparatus 20 and the control system 18 to remove unwanted heavy hydrocarbons prior to the compressed gas entering the control system 18. The optional filter 38 could be a coalescing filter, by way of example. One suitable optional filter 38 for use in the present invention is a Parker J Series filter commercially available from Parker Hannifin (Oxford, Mich.). However, one of ordinary skill in the art will appreciate that other suitable filters could be utilized.

The bypass conduit 22 conveys compressed gas, i.e., the bypass fill portion 24a, from the compressors 12a-c to the distributor 26 (FIGS. 1-3) or distributors 26a-c (FIGS. 4 and 5), thereby bypassing the control system 18 or priority panel. Specifically, as shown in FIGS. 1-3, the outlet of the bypass conduit 22 is fluidly connected to a single distributor 26. Alternatively, multiple distributors 26a-c may be utilized as shown in FIGS. 4 and 5, where each dispenser 30a-c has a corresponding distributor 26a-c. The inlet of the bypass conduit 22 is fluidly connected between the compressors 12a-c and the backpressure apparatus 20. FIGS. 4 and 5 show distributors 26a-c being separate from, and not contained within, dispensers 30a-c, potentially below the dispenser in the "sump". However, a person of ordinary skill in the art will appreciate that distributors 26a-c may be placed within the dispensers 30a-c.

Additionally, a person of ordinary skill in the art will appreciate that the bypass conduit 22 may be made from a variety of materials and have a variety of diameters, depending on the particular application. If required by code or for safety reasons, a bypass shutoff 42 may be incorporated as part of the bypass conduit 22 prior to, or fluidly upstream of, the distributor 26. This bypass shutoff 42 may be a valve or other suitable flow control device. As shown in FIGS. 1-3, a check valve 44 may be incorporated as part of the bypass conduit 22 prior to, or fluidly upstream of, the bypass shutoff 42 and the distributor 26. Alternatively, as shown in FIGS. 4 and 5, check valve 44 may be incorporated fluidly downstream of the bypass shutoff 42. Additionally, as shown in FIGS. 4 and 5, a needle valve 54 may be incorporated downstream of the check valve 44.

Referring now to FIGS. 1-3, not all of the compressed gas conveyed through the bypass conduit 22 can pass through the distributor 26, since the distributor 26 is selectively chosen to limit the flow of compressed gas therethrough. This causes the pressure of the compressed gas at, or upstream of, the backpressure apparatus 20 to exceed the intended set point of the backpressure apparatus 20. In response thereto, the backpressure apparatus 20 will allow the non-bypass fill portion 24b-c of compressed gas to flow to the control system 18. This results in a continuous flow of compressed gas to all vehicles during a dispensing operation. The orifice of the at least one distributor 26 may be sized appropriately to only allow a portion of the compressed gas generated by the compressors 12a-c, to pass therethrough, while maintaining a suitable backpressure upstream of the backpressure apparatus 20 so that the remaining gas, i.e., the non-bypass fill portion 24b-c of the compressed gas, will pass through the backpressure apparatus 20. The non-bypass fill portion 24b-c of the compressed gas will flow through the high storage bank delivery conduits 28c, 28d when multiple vehicles are obtaining compressed gas from these respective delivery conduits. The introduction of the bypass fill portion 24a of compressed gas may be at any point between the control system 18 and the plurality of compressed gas dispensers 30. For example, the bypass fill portion 24a of compressed gas may be introduced inside each dispenser 30a-c of the plurality of compressed gas dispensers 30.

As shown in FIGS. 1-3, the distributor 26 is fluidly connected to the bypass conduit 22 and to a plurality of delivery conduits 28. The distributor 26 is designed to allow the bypass fill portion 24a of compressed gas to bypass the control system 18 or priority panel entirely, and be dispensed directly to one or more vehicles from one or more compressed gas dispensers 30.

The distributor 26 may comprise one or more adaptors, a milled manifold block having a plurality of fluid passageways formed therein, or any other structure suitable to fluidly connect the bypass conduit 22 to the plurality of delivery conduits 28. The one or more adaptors could be T-shaped adaptor, a Y-shaped adaptor or any other suitable adaptor known to those of ordinary skill in the art. The manifold block may be milled from steel or other suitable material, or alternatively, could be made from a variety of other manufacturing processes known to a person of ordinary skill in the art. The distributor 26 may be unitary piece or be comprised of many individual pieces. The distributor 26 may optionally include an apparatus to fine tune the volume of the bypass fill portion 24a before entering the distributor 26, such as a needle valve (not shown). If desired, the distributor 26 can be heated to prevent freezing if the operating climate so requires. The distributor 26 may include one or more reducing adaptors. A suitable reducing adaptor for use in the present invention is commercially available from Swagelok (Solon, Ohio), part number SS-400-6-2.

Referring now to FIGS. 1-3, check valves 50a-b are used to prevent compressed gas from reentering the priority panel or control system 18 from the distributor 26. Check valves 50a-b allow the compressed gas to flow in only one direction, allowing the compressed gas to flow from the control system 18 to the distributor 26, and to the pair of high storage bank delivery conduits 28c-d. One suitable check valve 50a-b for use in the present invention is commercially available from Swagelok (Solon, Ohio), part number SS-CHS4-1.

With continued reference to FIGS. 1 and 2, the plurality of delivery conduits 28 are used to convey the compressed gas from the distributor 26 to two or more compressed gas dispensers 30a-b located fluidly downstream of the priority panel or control system 18. The delivery conduits 28 are typically sized to maximize the flow of the compressors 12a-c, even if only a single vehicle seeks compressed gas. As shown in FIG. 1, the compressed gas delivery system 10, according to another aspect of the present invention, has a low storage bank delivery conduit 28a, a middle storage bank delivery conduit 28b, and two high storage bank delivery conduits 28c or 28d, each being fluidly connected to the control system 18 or priority panel and to the compressed gas dispensers 30a-b. In this embodiment, each of the plurality of compressed gas dispensers 30a-b is fluidly connected to a separate high storage bank delivery conduit 28c or 28d, respectively, so that if three compressed gas dispensers were provided, for example, three high storage bank delivery conduits would be utilized. Likewise, if four compressed gas dispensers 30 were provided, four high storage bank delivery conduits would be utilized, and so on. The compressed gas dispensers 30a-b are configured to convey compressed gas to a pair of vehicles (not shown) located at the pair of compressed gas dispensers 30a-b.

FIGS. 1 and 2 show two compressed gas dispensers 30a-b, FIG. 3 shows a single compressed gas dispenser 30, and FIGS. 4 and 5 show three compressed gas dispensers 30a-c. In FIGS. 1 and 2, each compressed gas dispenser 30a-b can provide compressed gas to one or more vehicles (not shown). FIG. 3 shows a single compressed gas dispenser 30 that can provide compressed gas to one or more vehicles (not shown) at a time during a dispensing operation using one or more delivery hoses (not shown). In another embodiment, the bypass fill portion 24a may be conveyed to a single compressed gas dispenser 30a. As shown in FIG. 3, the bypass conduit 22 is fluidly connected to the compressed gas dispenser 30 and the distributor 26, both of which can be located within the compressed gas dispenser 30. If required by code or for safety reasons, a bypass shutoff 42 may be incorporated as part of the bypass conduit 22 prior to, or fluidly upstream of, the distributor 26. Also, a check valve 44 may be incorporated as part of the bypass conduit 22 prior to, or fluidly upstream of, the bypass shutoff 42 and the distributor 26.

Alternatively, as shown in FIGS. 4 and 5, a single high bank delivery conduit 28c may extend from the control system 18 to the compressed gas dispensers 30a-c. As shown, each of the compressed gas dispensers 30a-c, contain separate distributors 26a-c fluidly connected to the bypass conduit 22 for conveying the bypass portion 24a of the compressed gas. Additionally, a single bypass conduit 22 is positioned between the control system 18 and the plurality of dispensers 30. The distributors 26a-c may be positioned in the space below each dispenser 30a-c (known as the "sump"). This arrangement allows distributors 26a-c to provide the bypass fill portion 24a to dispenser 30a-c, each of which may have one or more hoses (not shown) connected thereto.

While not shown in FIG. 4, the bypass fill portion 24a may be conveyed through the middle storage bank delivery conduit 28b to reduce the number of conduits connecting to the compressed gas dispensers 30a-c. For example, if two vehicles seek compressed gas simultaneously, one vehicle could obtain the storage fill portion 24b using the high storage bank delivery conduit 28c while the other vehicle may obtain the bypass fill portion 24a using another delivery conduit 28, such as, for example, the middle storage bank delivery conduit 28b. This allows the compressed gas delivery system 300 to be retrofitted on current systems without having to add an additional bypass conduit 22. An additional check valve would be incorporated into the middle storage bank delivery conduit, downstream of the control system 18 and upstream of the bypass conduit 22 merging with the middle storage bank delivery conduit 28b. Likewise, check valves and distributors 26a-c would be incorporated downstream on, or near, each dispenser 30a-c of the plurality of dispensers 30.

While the compressed gas flow rate in the bypass conduit 22 will change significantly throughout the various stages of a multiple vehicle fill, the bypass conduit 22 conveys gas to a vehicle having a higher tank pressure than other vehicle(s) on the same bank enabling continuous flow to multiple vehicles as long as the inlet of the bypass conduit 22 has a higher pressure than the pressure of the vehicle having a higher tank pressure.

Figure 1A:
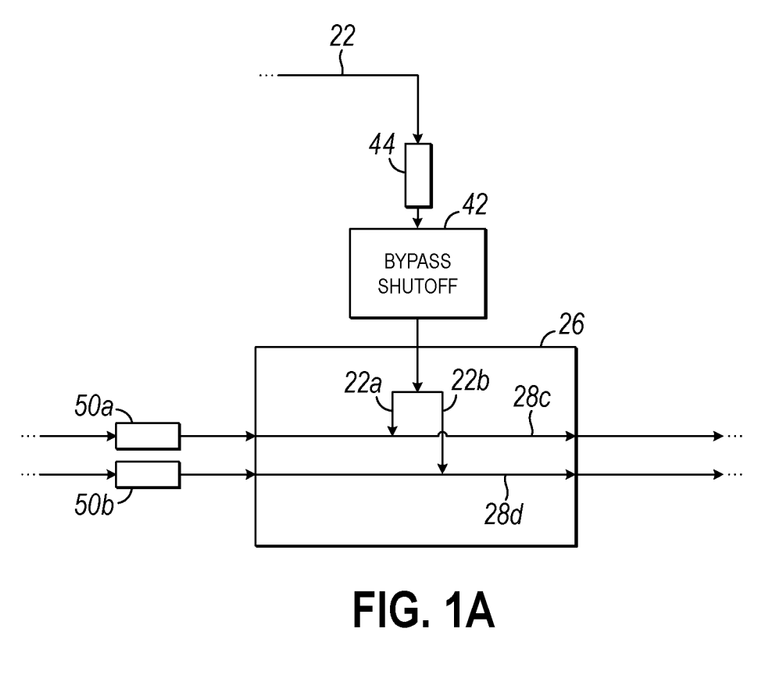
FIG. 1A is an enlarged view of an embodiment of the encircled area 1A in FIG. 1, showing details of the distributor's fluid connection to the compressed gas delivery system.

In one embodiment, FIG. 1A shows a detailed schematic of the distributor 26 and how the distributor 26 is fluidly connected to the compressed gas delivery system 10, 100. One suitable bypass conduit 22 for use in the present invention is a 0.25 inch outer diameter stainless steel tubing commercially available from Swagelok (Solon, Ohio), part number SS-T4-S-049-20. A T-shaped adaptor comprising part of the distributor 26, splits the 0.25 inch diameter bypass conduit 22 into two 0.125 inch outer diameter split bypass conduits 22a-b. One suitable T-shaped adaptor suitable for use in the present invention is commercially available from Swagelok (Solon, Ohio), part number SS-400-3.

In this embodiment, one suitable conduit for use in the present invention as the split bypass conduits 22a-b, could be 0.125 inch outer diameter conduit commercially available from Swagelok (Solon, Ohio), part number SS-T2-S-028-20. The split bypass conduits 22a-b create a suitable backpressure upstream of the backpressure apparatus 20, so as to only allow a portion of the compressed gas created by the compressors 12a-c to be conveyed therethrough. This enables the remainder of compressed gas, i.e., the non-bypass fill portion 24b-c, to flow through the backpressure apparatus 20 and to the control system 18. In this embodiment, the split bypass conduit 22a could be a 0.125 inch outer diameter conduit that is fluidly connected to the control system 18 and to a first high storage bank delivery conduit 28c. In this embodiment, the split bypass conduit 22b could be a 0.125 inch outer diameter conduit that is fluidly connected to the control system 18 and to the second high storage bank delivery conduit 28d. A person of ordinary skill in the art will understand a range of conduit outer diameters may be utilized based on the requirements of the compressed gas delivery system 10, 100, 200, 300, 400 application. Suitable adaptors (not shown) are provided to fluidly connect the pair of split bypass conduits 22a-b, which may each have a 0.125 inch outer diameter, to the pair of first and second high storage bank delivery conduits 28c-d, respectively, which may each have a 1.0 inch outer diameter.

In one embodiment, compressors 12a-c compress the gas supplied from the gas source 14 at approximately 500 standard cubic feet per minute (scfm). The backpressure apparatus 20 creates the region of higher pressure between the compressors 12a-c and the backpressure apparatus 20, prior to the downstream control system 18. This allows the bypass fill portion 24a of the compressed gas to bypass the normal operation of the control system 18 or priority panel, and based on the sizing of the conduits used, continuously flow a portion of the 500 scfm to a vehicle having a higher tank pressure. During direct fill, the compressors 12a-c operate with the backpressure apparatus 20 create a backpressure between the compressors 12a-c and the backpressure apparatus 20.

Exemplary flow calculations can be seen in Table 1. One suitable split bypass conduit 22a-b for use in the present invention could be 0.125 inch diameter conduit commercially available from Swagelok (Solon, Ohio), part number SS-T2-S-028-20 having a tube outer diameter of 0.125 inches, a tube inner diameter of 0.069 inches, a tube wall of 0.028 inches, a weight of 0.029 pounds per foot, and a working pressure of 8,500 psig. For these exemplary flow calculations, the distributor 26 has an inner diameter of 0.069 inches.

In an exemplary embodiment, assume that two vehicles, vehicle A and vehicle B, located at the compressed gas dispensers 30a-b, seek compressed gas from the high storage bank 16a, while the compressors 12a-c are operating. With current compressed gas systems, most, if not all, of the compressed gas from the high storage bank delivery conduit 28c-d would be dispensed to the vehicle having the lower tank pressure. However, with the use of the backpressure apparatus 20, the distributor 26, and the operation of compressors 12a-c, a suitable backpressure is created that can supply the bypass conduit 22 with the bypass fill portion 24a of compressed gas, while allowing the non-bypass fill portion 24b-c of compressed gas to flow through the backpressure apparatus 20 and to the control system 18.

In this two vehicle exemplary embodiment, a portion of the bypass fill portion 24a of the compressed gas flows to the vehicle having a higher tank pressure, while the other portion of the bypass fill portion 24a of the compressed gas flows to the vehicle having the lower tank pressure. The non-bypass fill portion 24b-c of compressed gas, which could not be conveyed through the distributor 26, is conveyed through the backpressure apparatus 20 and flows to the vehicle having a lower tank pressure. While the compressed gas flows may not necessarily be evenly split, multiple vehicles could obtain compressed gas regardless of their vehicle tank pressures to achieve a full tank fill of 3,600 psig at 70° F. and maintain the temperature compensated set points of the compressed gas dispensers 30. This allows for a continuous fueling experience for both vehicles.

Considering this exemplary embodiment and referring to Table 1 in particular, assume compressors 12a-c compress gas at a rate of 500 scfm. Further assume that the backpressure apparatus 20 is set to a target pressure of 4,000 psig. Vehicle A has a vehicle tank pressure of 3,000 psig, resulting in a 1,000 psig pressure differential between the target pressure of 4,000 psig and vehicle A's tank pressure of 3,000 psig. Vehicle B has a vehicle tank pressure of 2,400 psig, resulting in a 1,600 psig pressure differential between the target pressure of 4,000 psig and vehicle B's tank pressure of 2,400 psig. Using Table 1, this would allow vehicle A, having a 1,000 psig pressure differential, to receive 102 scfm of the bypass fill portion 24a of compressed gas. Further using Table 1, this would allow vehicle B to receive 121 scfm of the bypass fill portion 24a of compressed gas and 277 scfm of the non-bypass fill portion 24b-c of compressed gas. This exemplary embodiment would allow vehicle A to receive 102 scfm of compressed gas and vehicle B to receive 398 scfm of compressed gas. One of ordinary skill in the art will appreciate that different flow rates could occur at various times during the fill, and this exemplary embodiment provides a snapshot of the compressed gas delivery system 10, 100, 200 at a single point in time.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

diverting a bypass fill portion of the compressed gas through a bypass conduit to at least one distributor, wherein the bypass conduit is fluidly connected between the at least one compressor and the backpressure apparatus;

conveying the bypass fill portion of the compressed gas through the at least one distributor to at least one of the one or more delivery conduits and subsequently to at least the first vehicle having the higher tank pressure; and conveying the non-bypass fill portion of the compressed gas through at least one of the one or more the delivery conduits to at least the second vehicle having the lower tank pressure.

TABLE 1

Exemplary Flow Calculations

| | | | | | | | | | |
|---|---|---|---|---|---|---|---|---|---|
| Bypass Fill Portion Flow Rate Estimation (SC FM) | 1 | 49 | 68 | 82 | 93 | 102 | 109 | 116 | 121 |
| Viscosity | 0.018 | 0.018 | 0.018 | 0.018 | 0.018 | 0.018 | 0.018 | 0.018 | 0.018 |
| Temperature (° F.) | 70 | 70 | 70 | 70 | 70 | 70 | 70 | 70 | 70 |
| Gas Molecular Weight | 19.5 | 19.5 | 19.5 | 19.5 | 19.5 | 19.5 | 19.5 | 19.5 | 19.5 |
| Specific Heat Ratio | 1.27 | 1.27 | 1.27 | 1.27 | 1.27 | 1.27 | 1.27 | 1.27 | 1.27 |
| Compressibility Factor | 1 | 1 | 1 | 1 | 1 | 1 | 1 | 1 | 1 |
| Inlet Pressure (PSIG) | 4000 | 4000 | 4000 | 4000 | 4000 | 4000 | 4000 | 4000 | 4000 |
| Pipe Length (Feet) | 1 | 1 | 1 | 1 | 1 | 1 | 1 | 1 | 1 |
| Pressure Differential Target (PSIG) | 0 | 200 | 400 | 600 | 800 | 1000 | 1200 | 1400 | 1600 |
| Pressure loss (PSIG) | 0.103 | 198.964 | 396.962 | 599.225 | 801.094 | 1002.894 | 1190.001 | 1413.34 | 1604.253 |
| Overall K | 9.747 | 9.398 | 9.396 | 9.395 | 9.394 | 9.394 | 9.394 | 9.393 | 9.393 |
| K1 | 235677.137 | 93.175 | 46.568 | 30.983 | 23.405 | 18.973 | 16.275 | 14.064 | 12.721 |
| K2 | 235667.389 | 83.777 | 37.172 | 21.588 | 14.011 | 9.579 | 6.881 | 4.67 | 3.328 |
| Inlet Mach Number | 0.002 | 0.09 | 0.124 | 0.15 | 0.17 | 0.186 | 0.199 | 0.212 | 0.221 |
| Outlet Mach Number | 0.002 | 0.094 | 0.138 | 0.176 | 0.212 | 0.249 | 0.283 | 0.327 | 0.368 |
| Reynolds Number | 15675 | 768058 | 1065877 | 1285322 | 1457743 | 1598815 | 1708538 | 1818261 | 1896634 |
| Flow Region | Turbulent | Turbulent | Turbulent | Turbulent | Turbulent | Turbulent | Turbulent | Turbulent | Turbulent |
| Fluid Velocity (ft/sec) | 2.395 | 117.37 | 162.88 | 196.415 | 222.763 | 244.321 | 261.088 | 277.855 | 289.831 |
| Density at Inlet | 13.766 | 13.766 | 13.766 | 13.766 | 13.766 | 13.766 | 13.766 | 13.766 | 13.766 |
| Specific Vol. at Inlet | 0.073 | 0.073 | 0.073 | 0.073 | 0.073 | 0.073 | 0.073 | 0.073 | 0.073 |

What is claimed is:

1. A method of continuously conveying compressed gas to a plurality of vehicles, wherein the plurality of vehicles includes at least a first vehicle having a higher tank pressure and a second vehicle having a lower tank pressure that are simultaneously seeking compressed gas from the same fluidly connected delivery conduit, the method comprising:

compressing gas using at least one compressor;

conveying the compressed gas from the at least one compressor to a backpressure apparatus, wherein the backpressure apparatus is fluidly connected to the at least one compressor;

conveying a non-bypass fill portion of the compressed gas through the backpressure apparatus as either a direct fill portion, a storage fill portion, or a combination thereof;

2. The method of claim 1, further comprising:

fluidly connecting a control system between the backpressure apparatus and the at least one distributor, wherein the control system includes a priority panel.

3. The method of claim 2, further comprising:

conveying the non-bypass fill portion of the compressed gas to the control system using the backpressure apparatus, wherein the backpressure apparatus is fluidly connected between the at least one compressor and the control system.

4. The method of claim 2, further comprising:

conveying the storage fill portion of the compressed gas to a storage bank arrangement including one or more storage banks, each storage bank being fluidly connected to the control system; and subsequently conveying the storage fill portion of the compressed gas from the storage bank arrangement to the control system.

5. The method of claim 2, wherein the one or more delivery conduits further comprise a low storage bank delivery conduit, a middle storage bank delivery conduit, and at least one high storage bank delivery conduits, each being fluidly connected to the control system.

6. The method of claim 2, further comprising:
creating a low pressure gas region between the backpressure apparatus and the control system.

7. The method of claim 2, wherein the backpressure apparatus creates a high pressure gas region between the backpressure apparatus and the at least one compressor to divert the bypass fill portion of compressed gas to the distributor located fluidly downstream of the control system, so that the bypass fill portion does not enter the control system.

8. The method of claim 1, wherein the bypass conduit has first and second ends, the method further comprising:
fluidly connecting the first end between the at least one compressor and the backpressure apparatus; and
fluidly connecting the second end to the at least one distributor.

9. The method of claim 1, wherein the compressed gas is natural gas or hydrogen.

10. The method of claim 1, wherein the backpressure apparatus is selected from the group consisting of a reducing adaptor, a mechanical valve, and a positional valve.

11. The method of claim 1, further comprising:
fluidly coupling a bypass shutoff to the bypass conduit upstream of the at least one distributor.

12. The method of claim 1, wherein the at least one distributor includes a T-shaped adaptor, a Y-shaped adaptor, a milled manifold block, or a reducing adaptor having a reduced inner diameter.

13. The method of claim 1, further comprising:
sizing an orifice of the at least one distributor to only allow a portion of the compressed gas to pass therethrough, while maintaining a suitable backpressure upstream of the backpressure apparatus so that the non-bypass fill portion of the compressed gas passes through the backpressure apparatus.

14. The method of claim 1, further comprising:
fluidly connecting the at least one distributor to a first dispenser using at least one of the one or more delivery conduits to provide compressed gas to the first vehicle having a higher tank pressure;
fluidly connecting the at least one distributor to a second dispenser using at least one of the one or more delivery conduits to provide compressed gas to the second vehicle having a lower tank pressure than the first vehicle; and
fluidly connecting the at least one distributor to a third dispenser using at least one of the one or more delivery conduits to provide compressed gas to a third vehicle having a lower tank pressure than the first vehicle.

15. The method of claim 14, wherein the first dispenser includes a first distributor, the second dispenser includes a second distributor, and the third dispenser includes a third distributor.

16. A method of continuously conveying compressed gas to a plurality of vehicles, wherein the plurality of vehicles includes at least a first vehicle having a higher tank pressure and a second vehicle having a lower tank pressure that are simultaneously seeking compressed gas from the same fluidly connected delivery conduit, the method comprising:
compressing gas using at least one compressor;
conveying the compressed gas from the at least one compressor to a backpressure apparatus, wherein the backpressure apparatus is fluidly connected to the at least one compressor;
conveying a non-bypass fill portion of the compressed gas through the backpressure apparatus as either a direct fill portion, a storage fill portion, or a combination thereof;
diverting a bypass fill portion of the compressed gas through a bypass conduit to at least one distributor, wherein the bypass conduit is fluidly connected at a first end between the at least one compressor and the backpressure apparatus and at the second end to the at least one distributor;
conveying the non-bypass fill portion of the compressed gas to a control system that includes a priority panel, wherein the control system is fluidly connected between the backpressure apparatus and the at least one distributor;
conveying the storage fill portion of the compressed gas to and then subsequently from a storage bank arrangement including one or more storage banks, wherein the storage bank arrangement is fluidly connected to the control system;
conveying the bypass fill portion of the compressed gas through the at least one distributor to at least one of the one or more delivery conduits and subsequently to at least the first vehicle having the higher tank pressure; and
conveying the non-bypass fill portion of the compressed gas from the control system through at least one of the one or more delivery conduits to the second vehicle having the lower tank pressure.

17. The method of claim 16, wherein the backpressure apparatus is selected from the group consisting of a reducing adaptor, a mechanical valve, and a positional valve.

18. The method of claim 16, wherein the at least one distributor includes a T-shaped adaptor, a Y-shaped adaptor, a milled manifold block, or a reducing adaptor having a reduced inner diameter to limit the amount of flow therethrough.

* * * * *

UNITED STATES PATENT AND TRADEMARK OFFICE
CERTIFICATE OF CORRECTION

PATENT NO. : 9,897,256 B2
APPLICATION NO. : 15/705874
DATED : February 20, 2018
INVENTOR(S) : Mrowzinski It is certified that error appears in the above-identified patent and that said Letters Patent is hereby corrected as shown below:

On the Title Page

Item (57), Column 2, Line 15, change "through at least one of the one or more the delivery conduits" to --through at least one of the one or more delivery conduits--.

In the Specification

In Column 3, Line 5, change "but rather, is dispensed directly through the control system" to --but rather is dispensed directly through the control system--.

In Column 4, Lines 43-44, change "through the bypass conduit, but rather, that portion of the compressed that flows through the backpressure apparatus as" to --through the bypass conduit, but rather that portion of the compressed gas that flows through the backpressure apparatus as--.

In Column 9, Lines 46-47, change "The one or more adaptors could be T-shaped adaptor, a Y-shaped adaptor or any other suitable" to --The one or more adaptors could be a T-shaped adaptor, a Y-shaped adaptor or any other suitable--.

In Column 9, Line 52, change "The distributor 26 may be unitary piece" to --The distributor 26 may be a unitary piece--.

In Column 12, Lines 6-7, change "operate with the backpressure apparatus 20 create a backpressure" to --operate with the backpressure apparatus 20 to create a backpressure--.

In Column 12, Lines 13-18, change "having a tube outer diameter of 0.125 inches, a tube inner diameter of 0.069 inches, a tube wall of 0.028 inches, a weight of 0.029 pounds per foot, and a working pressure of 8,500 psig. For these exemplary flow calculations, the distributor 26 has an inner diameter of 0.069 inches." to --having a tube outer diameter of 0.125 inch, a tube inner diameter of 0.069 inch, a tube wall of 0.028 inch, a weight of 0.029 pound per foot, and a working pressure of Signed and Sealed this
First Day of May, 2018

Andrei Iancu
*Director of the United States Patent and Trademark Office*

8,500 psig. For these exemplary flow calculations, the distributor 26 has an inner diameter of 0.069 inch.--.

In the Claims

In Claim 1, Column 14, Line 12, change "at least one of the one or more the delivery" to --at least one of the one or more delivery--.

In Claim 5, Column 15, Line 7, change "at least one high storage bank delivery conduits, each being fluidly connected" to --at least one high storage bank delivery conduit, each being fluidly connected--.